(12) United States Patent
Bercx et al.

(10) Patent No.: US 10,072,105 B2
(45) Date of Patent: Sep. 11, 2018

(54) METHOD FOR MANUFACTURE OF LOW EMISSIONS POLYPROPYLENE

(71) Applicant: SABIC GLOBAL TECHNOLOGIES B.V., Bergen op Zoom (NL)

(72) Inventors: Rick Robert Emilie Bercx, Geleen (NL); Christelle Marie Hélène Grein, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/129,744

(22) PCT Filed: Mar. 12, 2015

(86) PCT No.: PCT/EP2015/055167
§ 371 (c)(1),
(2) Date: Sep. 27, 2016

(87) PCT Pub. No.: WO2015/150042
PCT Pub. Date: Oct. 8, 2015

(65) Prior Publication Data
US 2017/0137544 A1 May 18, 2017

(30) Foreign Application Priority Data
Mar. 31, 2014 (EP) ..................................... 14162786

(51) Int. Cl.
| | | |
|---|---|---|
| *C08F 8/50* | (2006.01) | |
| *C08L 23/14* | (2006.01) | |
| *C08L 23/26* | (2006.01) | |
| *C08K 7/14* | (2006.01) | |

(52) U.S. Cl.
CPC .................. *C08F 8/50* (2013.01); *C08K 7/14* (2013.01); *C08L 23/14* (2013.01); *C08L 23/26* (2013.01); *C08L 2023/42* (2013.01); *C08L 2205/025* (2013.01); *C08L 2207/02* (2013.01)

(58) Field of Classification Search
CPC ... C08F 8/50; C08K 7/14; C08L 23/14; C08L 23/26; C08L 2023/42; C08L 2205/025; C08L 2207/02
See application file for complete search history.

(56) References Cited

U.S. PATENT DOCUMENTS

| | | |
|---|---|---|
| 4,282,076 A | 8/1981 | Boynton |
| 6,218,504 B1 | 4/2001 | Dolle et al. |
| 2007/0200272 A1 | 8/2007 | Horst et al. |
| 2010/0324225 A1 | 12/2010 | Zummallen |

FOREIGN PATENT DOCUMENTS

| | | |
|---|---|---|
| EP | 0063654 A1 | 11/1982 |
| GB | 1272778 A | 5/1972 |
| WO | 02088194 A1 | 11/2002 |
| WO | 2004039848 A1 | 5/2004 |
| WO | 2009080821 A2 | 7/2009 |
| WO | 2012000022 A1 | 1/2012 |
| WO | 2014044682 A1 | 3/2014 |
| WO | WO 2014/044682 A1 * | 3/2014 |

OTHER PUBLICATIONS

Written Opinion; International Application No. PCT/EP2015/055167;International Filing Date: Mar. 12, 2015; dated Apr. 24, 2015; 5 Pages.
International Search Report; International Application No. PCT/EP2015/055167;International Filing Date: Mar. 12, 2015; dated Apr. 24, 2015; 5 Pages.
Fang et al., "Progress in Applications of Long Fiber reinforced Thermoplastics in Automotive Parts," China Plastics, vol. 23, No. 3, Mar. 2009, 6 Pages.

* cited by examiner

*Primary Examiner* — Robert Harlan
(74) *Attorney, Agent, or Firm* — Cantor Colburn LLP

(57) ABSTRACT

The present invention relates to a method for the manufacture of polypropylene having a target melt flow rate of from 10 to 200 g/10 min as determined in accordance with ISO 1133 (230° C., 2.16 kg) comprising the sequential steps of i) polymerizing propylene monomer, and optionally one or more alpha olefin co-monomers so as to form a polypropylene having an initial melt flow rate of from 0.5 to 20 g/10 min (ISO 1133, 230° C., 2.16 kg), ii) visbreaking said polypropylene to obtain polypropylene having said target melt flow rate and wherein the ratio of target to initial melt flow rate is more than 1 iii) maintaining the polypropylene obtained from step ii) at an elevated temperature for a time sufficient to reduce the FOG value of the polypropylene as determined in accordance with VDA 278. The method allows the time for FOG reduction to be reduced as compared to polypropylenes that have the same target melt flow rate, yet which have obtained said melt flow rate without the visbreaking step.

20 Claims, 1 Drawing Sheet

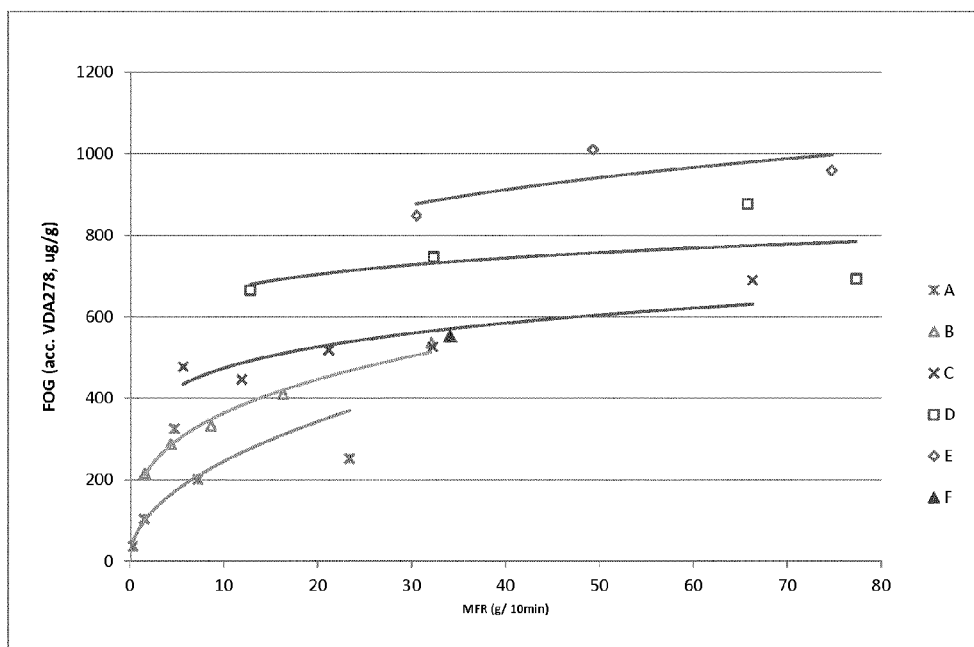

METHOD FOR MANUFACTURE OF LOW EMISSIONS POLYPROPYLENE

CROSS REFERENCE TO RELATED APPLICATIONS

This application is a 371 of International Application No. PCT/EP2015/055167, filed Mar. 12, 2015, which claims priority to European Application No. 14162786.9, filed Mar. 31, 2014 which are incorporated herein by reference in their entirety.

The present invention relates to a method for the manufacture of polypropylene having a target melt flow rate of from 10 to 200 g/10 min as determined in accordance with ISO 1133 (230° C., 2.16 kg) and having low FOG values as determined in accordance with VDA 278.

Polypropylene is the material of choice for many applications, in particular for applications in the automotive interior. One of the requirements for polypropylene in automotive interior applications is that the polypropylene, or a composition based on said polypropylene has a relatively low emission of low molecular weight materials. In other words, such polypropylene may contain only a very low amount of low molecular weight materials, because such low molecular weight materials can cause an unpleasant odor, a sticky feeling of the surface or may condense against windscreens thereby causing a reduced visibility.

One of the requirements related to such emission is laid down in the VDA 278 standard. The emission as determined in that standard is referred to as the FOG value. For example car manufacturers may require that the FOG value is typically at most 500 µg/g, more in particular at most 400 µg/g. With requirements becoming more strict in the future FOG values of at most 250 µg/g are desirable.

Currently a method for reducing FOG involves maintaining polypropylene pellets or powders at a certain elevated temperature for a certain amount of time. For example polypropylene pellets or powder may be continuously fed to the top of a silo where the polypropylene is preferably contacted in counter-flow with a stream of hot gas, which may be for example nitrogen or dried air. At the bottom of the silo polypropylene having a reduced FOG value is then continuously withdrawn. This process is often referred to as venting or purging. It is noted that this venting or purging should not be confused with the removal of unreacted monomer as is usually carried out directly after polymerisation.

Venting or purging processes are disclosed for example in GB 1272778, WO 02/088194, WO2004/039848 and U.S. Pat. No. 6,218,504. Other methods to remove low molecular weight materials also exist, among which are steam stripping or chemical treatment.

A disadvantage of a venting step is that such a step adds cost to the final polypropylene product. In particular it is noted that polypropylenes having a relatively high initial FOG value generally need to be maintained for a longer period of time in the venting equipment. Such a longer residence time not only increases the overall cost, but may also have a negative effect on the optical properties of the material in that the polypropylene suffers from more yellowing.

It is therefore an object of the present invention to find an improved method of manufacturing polypropylene having low FOG values while maintaining desirable mechanical and rheological properties.

This object is met in accordance with the invention which is generally directed to the manufacture of polypropylene having a target melt flow rate of from 10 to 200 g/10 min as determined in accordance with ISO 1133 (230° C., 2.16 kg) comprising the sequential steps of i) polymerizing propylene monomer, and optionally one or more alpha olefin co-monomers so as to form a polypropylene having an initial melt flow rate of from 0.5 to 20 g/10 min (ISO 1133, 230° C., 2.16 kg), ii) visbreaking said polypropylene to obtain polypropylene having said target melt flow rate and wherein the ratio of target to initial melt flow rate is more than 1, and iii) maintaining the polypropylene obtained from step ii) at an elevated temperature for a time sufficient to reduce the FOG value of the polypropylene as determined in accordance with VDA 278

The steps i) and ii) are carried out sequentially and preferably directly after one another. That is, step ii) is carried out on the polypropylene obtained directly from step i). It is noted however that step i) may include after the polymerisation the addition of common stabilisers for preventing the polypropylene of step i) a from degradation, such being well known to the skilled person. Any polypropylene compositions however, e.g. compositions obtainable by adding fillers, rubbers, pigments and the like to the polypropylene are manufactured after step ii) or iii). It is preferred to manufacture polypropylene compositions after step iii) and based on the polypropylene so obtained.

The polymerising of olefins and optionally one or more alpha olefin co-monomers so as to form a polypropylene is well known in the art. In addition it is well known in the art that the melt flow rate of the obtained polypropylene can be adjusted by selecting the appropriate process conditions. Step i) as defined above is therefore similar to a step of manufacturing of a polypropylene having an initial melt flow rate of from 0.5 to 20 g/10 min (ISO 1133, 230° C., 2.16 kg) by polymerizing propylene monomer, and optionally one or more alpha olefin co-monomers. The polymerisation is carried out in a reactor as is also well known to a skilled person. Step i) may also be regarded as similar to providing a non-rheology controlled polypropylene having an initial melt flow rate of from 0.5 to 20 g/10 min (ISO 1133, 230° C., 2.16 kg).

WO 2014/044682 discloses a process for the preparation of a composition comprising a heterophasic propylene copolymer, a propylene copolymer and talc, wherein the composition has a desired melt flow index in the range of 1 to 200 dg/min as measured according to ISO 1133 (2.16 kg/230° C.) comprising the steps of (a) melt-mixing a propylene copolymer with a talc to obtain a masterbatch (b) melt-mixing the masterbatch with the heterophasic propylene copolymer and a peroxide to obtain the composition comprising a heterophasic propylene copolymer, a propylene copolymer and talc, wherein the amount of peroxide is chosen such that a composition comprising a heterophasic propylene copolymer, a propylene copolymer and talc having the desired melt flow index is obtained. This reference does not disclose a step of maintaining the polypropylene or the polypropylene composition at an elevated temperature for a time sufficient to reduce the FOG value. Further to that this document does not disclose the visbreaking of polypropylene prior to a step of maintaining the polypropylene at an elevated temperature for a certain time in order to lower the FOG value of the polypropylene.

US 2010/0324225 discloses a process for making a controlled rheology polypropylene resin. This reference does not disclose a step of maintaining the polypropylene at an elevated temperature for a certain time in order to lower the FOG value of the polypropylene.

US 2007/0200272 discloses a method for viscosity breaking of a polypropylene polymer, copolymer or polymer blend. This reference does not disclose a step of maintaining the polypropylene at an elevated temperature for a certain time in order to lower the FOG value of the polypropylene.

WO 2012/000022 discloses a process for increasing the melt flow index of a propylene polymer, the process comprising melt mixing the propylene polymer in the presence of aqueous hydrogen peroxide. This reference does not disclose a step of maintaining the polypropylene at an elevated temperature for a certain time in order to lower the FOG value of the polypropylene.

Suitable conditions in step iii) include maintaining the polypropylene obtained in step ii) at a temperature of at least 105° C. for a period of at least 48 hr. Preferred are periods of from 48 hr to 72 hr at temperature in the range of 105-125° C., the upper limit being selected such that the polypropylene will not stick together. Preferably the step of maintaining the polypropylene at an elevated temperature includes the application of a purging stream of a gas so as to transport volatile materials leaving the particulate polypropylene. Such methods are sometimes referred to as "venting". The step of maintaining may be carried out in accordance with methods known in the art such as those disclosed in for example in GB 1272778, WO 02/088194, WO2004/039848 and U.S. Pat. No. 6,218,504.

Thus, the object is met in accordance with the invention which is directed to the manufacture of polypropylene having a target melt flow rate of from 10 to 200 g/10 min as determined in accordance with ISO 1133 (230° C., 2.16 kg) comprising the sequential steps of
i) polymerizing propylene monomer, and optionally one or more alpha olefin co-monomers so as to form a polypropylene having an initial melt flow rate of from 0.5 to 20 g/10 min (ISO 1133, 230° C., 2.16 kg),
ii) visbreaking said polypropylene to obtain polypropylene having said target melt flow rate and wherein the ratio of target second to initial first melt flow rate is more than 1, and
iii) maintaining the polypropylene obtained from step ii) at a temperature of at least 105° C. for a period of at least 48 hr.

The present inventors surprisingly found that compared to polypropylenes having a target melt flow, yet manufactured without a step of visbreaking, the polypropylene obtained in accordance with the inventive method and after visbreaking has a lower FOG value. As such the residence time or temperature during the venting step may be reduced, thereby saving cost and/or increasing the overall output of the manufacturing process. The term "visbreaking" is well known in the field of the invention. For example methods of visbreaking polypropylene have been disclosed in U.S. Pat. No. 4,282,076 and EP 0063654. Both these prior art references disclose that a visbroken polymer of a given molecular weight has a better balance of processing and physical properties for many articles made from it than does a non-visbroken polymer having the same molecular weight.

Generally speaking, higher molecular weight leads to better physical properties but poorer processing properties; conversely, lower molecular weight leads to poorer physical properties but better processing properties. A low molecular weight polymer with narrow molecular weight distribution gives both good physical and processing properties in many fabricated articles. Therefore, it has been common procedure in the prior art to polymerize propylene polymers to a higher molecular weight than desired for the final application and then to visbreak to the desired molecular weight.

Several different types of chemical reactions which are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. It is preferred however that visbreaking is carried out using a peroxide. Such materials, at elevated temperatures, initiate a free radical chain reaction resulting in scission of the polypropylene molecules. The visbreaking may be carried out directly after polymerisation and removal of unreacted monomer and before pelletisation. However, the invention is not limited to such an embodiment and visbreaking may also be carried out on already pelletised polypropylene, which polypropylene generally contains stabilisers to prevent degradation.

In a preferred embodiment the polypropylene having the target melt flow rate has a FOG value as measured in accordance with VDA 278 of at most 600 µg/g, preferably at most 500 µg/g, more preferably 400 µg/g and even more preferably at most 250 µg/g. The skilled person will understand that the term µg/g means µg of low molecular weight components per gram of polypropylene.

Depending on the conditions at which the polypropylene is maintained in step iii) practical lower limits include at least 25 µg/g, at least 50 µg/g or at least 100 µg/g.

The target melt flow rate of the polypropylene is preferably from 20-70 g/10 min or from 20-50 g/10 min ((ISO 1133, 230° C., 2.16 kg).

The initial melt flow rate is preferably from 2-8 g/10 min ((ISO 1133, 230° C., 2.16 kg).

In a preferred embodiment the initial melt flow rate of the polypropylene is from 2-15 g/10 min or from 2-8 g/10 min ((ISO 1133, 230° C., 2.16 kg) and the target melt flow rate of the polypropylene is from 20-50 g/10 min ((ISO 1133, 230° C., 2.16 kg).

In a preferred embodiment the present invention is directed to a method for the manufacture of polypropylene having a target melt flow rate of from 10 to 100 g/10 min as determined in accordance with ISO 1133 (230° C., 2.16 kg) comprising the sequential steps of
i) polymerizing propylene monomer, and optionally one or more alpha olefin co-monomers so as to form a polypropylene having an initial melt flow rate of from 0.5 to 10 g/10 min (ISO 1133, 230° C., 2.16 kg),
ii) visbreaking said polypropylene to obtain polypropylene having said target melt flow rate and wherein the ratio of target to initial melt flow rate is more than 1
iii) maintaining the polypropylene obtained from step ii) at an elevated temperature for a time sufficient to reduce the FOG value of the polypropylene as determined in accordance with VDA 278.

In order to maintain good mechanical properties of the polypropylene as compared to polypropylene having the target melt flow rate which has not been manufactured involving a step of visbreaking, the ratio of target to initial melt flow rate is at least 2, preferably from 2 to 20, more preferably from 2 to 10, even more preferably from 4 to 10.

In principle the present invention is not limited to a particular type of polypropylene. As such the polypropylene may be a propylene homopolymer, a random propylene—α-olefin copolymer, a propylene—α-olefin block copolymer, a heterophasic propylene α-olefin copolymer and the like. In view of the target application of the propylene obtainable by the method of the invention however it preferred that the polypropylene is a heterophasic propylene copolymer. Heterophasic propylene copolymers are well known to those skilled in the art.

The polypropylene obtained after step ii) and/or iii) may be combined with one or more reinforcing fillers and/or impact modifiers and/or further additives. Examples of such reinforcing fillers include organic fibers, such as aramid, carbon or polyester fibers; inorganic fibers such as glass fibres; inorganic reinforcing fillers such as talc.

For example, the polypropylene obtained after step ii) may be compounded with a reinforcing filler, such as talc, and thereafter maintained at an elevated temperature so as to reduce the FOG value.

Similarly the reinforcing filler may be added after the polypropylene from step ii) has been maintained at elevated temperature in step iii). The present invention is not limited in this respect and further allows the combining of reinforcing filler with the polypropylene after both step ii) as step iii).

The polypropylene obtainable by the method of the invention may be compounded with such further materials, e.g. reinforcing fillers, using methods known in the art.

Alternatively the polypropylene obtained after step ii) or step iii) may be combined with one or more of a glass multifibre filament strand, or roving. Such may be accomplished by pulling such multifilament strand through a bath of molten thermoplastic material comprising or consisting of said polypropylene. Alternatively the thermoplastic material comprising or consisting of said polypropylene is applied as a sheath over said multifibre strand. Such a method is known for example from WO 2009/080821.

The so sheathed or pulltruded continuous (glass) multifilament strands may be cut into pellets of desired length such as from 2-50 mm, 5-20 mm or 10-15 mm.

Here again the step of pultrusion or sheathing may be carried out after step ii) and before step iii) or after step iii).

The present invention further relates to an automotive interior article comprising a polypropylene obtainable by the method of the invention. Such applications may include instrument panel carriers, door panels, dashboards, dashboard carriers, door claddings, door fixtures, armrests, pillar cladding, seat cladding, boot cladding, interior trims and applications in HVAC applications.

In a further aspect the present invention relates to a method for the manufacture of polypropylene having a target melt flow rate of from 10 to 200 g/10 min or 10 to 100 g/10 min as determined in accordance with ISO 1133 (230° C., 2.16 kg) and a FOG value of at most 600 µg/g, preferably at most 400 µg/g, more preferably at most 250 µg/g as determined in accordance with VDA278, the method comprising the sequential steps of
i) polymerizing propylene monomer, and optionally one or more alpha olefin co-monomers so as to form a polypropylene having an initial melt flow rate of from 0.5 to 20 g/10 min or 0.5 to 10 g/10 min (ISO 1133, 230° C., 2.16 kg),
ii) visbreaking said polypropylene using a peroxide to obtain polypropylene having said target melt flow rate, wherein the ratio of target to initial melt flow rate is more than 1.

The preferred embodiments disclosed hereinabove also apply to this further aspect.

In yet a further aspect the present invention relates to a method for the manufacture of an article comprising the steps of:
i) selecting a non-controlled-rheology polypropylene having a target melt flow rate and having properties suitable for the article,
ii) polymerizing propylene monomer, and optionally one or more co-monomers, under conditions that allow the manufacture of the polypropylene of step i) such that the polypropylene obtained in step ii) differs from the polypropylene in step i) in that it has an initial melt flow rate lower than the target MFR,
iii) visbreaking the polypropylene obtained in step ii) from the initial melt flow rate to the target melt flow rate
iv) shaping the polypropylene of step iii) into the article The target melt flow rate is preferably from 10 to 100 g/10 min as determined in accordance with ISO 1133 (230° C., 2.16 kg) and the initial melt flow rate is preferably from 0.5 to 10 g/10 min (ISO 1133, 230° C., 2.16 kg).

The preferred embodiments disclosed hereinabove also apply to this further aspect.

The present invention will now be further explained on the basis of the following non-limiting examples.

Measurements

Melt flow rate was determined in accordance with ISO 1133 at 230° C. and 2.16 kg.

FOG values were determined in accordance with VDA 278.

FOG was determined according to VDA 278:2011 from pellets. FOG according to VDA 278 is the sum of all organic compounds of low volatility, which have an elution time greater than or equal to n-tetradecane. FOG is calculated as tetradecane equivalent (TE). FOG according to VDA 278 represents organic compounds in the boiling point range of n-alkanes $C_{14}$ to $C_{32}$. VDA standards are issued by "Verband der Automobilindustrie". The VDA standards used herein are available from Dokumentation Kraftfahrwesen (DKF); Ulrichstrasse 14, D-74321 Bietigheim-issingen, Germany or can be downloaded from their website (www.dkf-ev.de).

EXPERIMENTS

Five base powders of (heterophasic) propylene copolymers were manufactured by co-polymerisation of propylene and ethylene using two reactors in series. In the first reactor the propylene homopolymer matrix phase was prepared. After polymerisation the powder of the first reactor was transported to the second reactor where the polymerisation was continued and wherein the rubber phase consisting of an ethylene-propylene copolymer was prepared. Table 1 below provides an overview of the powders A-E that were prepared in this manner. MFR_1 represents the melt flow rate of the propylene polymer manufactured in the first reactor, whereas MFR_total represents the melt flow rate of the final product, i.e. the heterophasic polypropylene. RCC2 represents the ethylene weight percentage in and based on the ethylene-propylene copolymer of the rubber phase of the heterophasic copolymer, whereas RC represents the amount of rubber phase based on the total weight of the heterophasic polypropylene.

TABLE 1

| Copol-powder | Reactor 1 MFR_1 (g/10 min) | Reactor 2 MFI_total (g/10 min) | RCC2 (wt %) | RC (wt %) |
| --- | --- | --- | --- | --- |
| A | 0.55 | 0.27 | 55 | 15.5 |
| B | 4.7 | 1.5 | 56.5 | 24.5 |
| C | 10.7 | 5.3 | 58 | 16.0 |
| D | 28 | 13.5 | 58 | 16.0 |
| E | 68 | 32 | 53 | 18.5 |

Starting from these powders polypropylenes were manufactured by shifting, or visbreaking, the powders to a higher melt flow rate.

Such was done by feeding the powder to an extruder and by adding Luperco 802PP40 as a peroxide (1,4-bis(2-tert-butylperoxypropan-2-yl)benzene, CAS Registry Number: 2781-00-2) in different amounts. Table 2, Table 3 and Table 4 below set out further details of these visbreaking experiments. Besides the peroxide some additives (0.74 weight parts) common in the art were also added. The additive package was the same for all experiments.

TABLE 2

|  | A1 | A2 | A3 | A4 | A5 | B1 | B2 | B3 | B4 | B5 |
|---|---|---|---|---|---|---|---|---|---|---|
| A | 99.26 | 99.23 | 99.18 | 99.15 | 99.03 |  |  |  |  |  |
| B |  |  |  |  |  | 99.26 | 99.23 | 99.19 | 99.13 | 99.03 |
| Peroxide | 0 | 0.03 | 0.08 | 0.11 | 0.23 | 0 | 0.03 | 0.07 | 0.13 | 0.23 |
| Additives | 0.74 | 0.74 | 0.74 | 0.74 | 0.74 | 0.74 | 0.74 | 0.74 | 0.74 | 0.74 |
| MFR [g/10 min] | 0.35 | 1.5 | 4.7 | 7.2 | 23.4 | 1.6 | 4.3 | 8.7 | 16.3 | 32.1 |
| FOG [µg/g] | 37 | 103 | 325 | 200 | 252 | 215 | 287 | 332 | 410 | 536 |

TABLE 3

|  | C1 | C2 | C3 | C4 | C5 | D1 | D2 | D3 | D4 |
|---|---|---|---|---|---|---|---|---|---|
| C | 99.26 | 99.23 | 99.19 | 99.15 | 99.06 |  |  |  |  |
| D |  |  |  |  |  | 99.26 | 99.21 | 99.15 | 99.12 |
| Peroxide | 0 | 0.03 | 0.07 | 0.11 | 0.20 | 0 | 0.05 | 0.11 | 0.14 |
| Additives | 0.74 | 0.74 | 0.74 | 0.74 | 0.74 | 0.74 | 0.74 | 0.74 | 0.74 |
| MFR [g/10 min] | 5.7 | 11.9 | 21.2 | 32.2 | 66.3 | 12.8 | 32.3 | 65.8 | 77.3 |
| FOG [µg/g] | 477 | 446 | 518 | 526 | 690 | 665 | 747 | 876 | 693 |

TABLE 4

|  | E1 | E2 | E3 |
|---|---|---|---|
| E | 99.26 | 99.22 | 99.19 |
| Peroxide | 0 | 0.04 | 0.07 |
| Additives | 0.74 | 0.74 | 0.74 |
| MFR [g/10 min] | 30.5 | 49.3 | 74.7 |
| FOG [µg/g] | 848 | 1010 | 959 |

As a check experiment F was carried out which was a run based on a polymer powder similar to the powder of experiment C, yet running at an industrial scale. The powder of experiment F was visbroken to a melt flow rate of about 35 gram per 10 min.

The data provided in the above tables is combined in FIG. 1, wherein experiment "F" is also added. The graph in FIG. 1 shows the melt flow rate on the horizontal axis, whereas on the vertical axis the FOG value is plotted. Trend lines are added to illustrate the effect observed by the present inventors.

From the FIG. 1 it can first of all be observed that the visbreaking of a material to a higher melt flow rate generally results in an increased FOG value. This is in particular true for polypropylene having a relatively low initial melt flow rate.

The graph however also shows that the FOG value of a material having a certain melt flow index depends on the initial melt flow rate. For example, the graph as well as the tables shows that a material having a melt flow rate of about 12 g/10 min and which is manufactured starting from a material having an initial melt flow rate of between 0.5 and 10 g/10 min has a lower FOG value than a material which was polymerised such that it has an initial melt flow rate of about 12 g/10 min.

The present inventors have further found that the mechanical properties of the visbroken materials are still acceptable compared to non-visbroken materials having the same melt flow rate.

The invention claimed is:

1. A method for the manufacture of polypropylene having a target melt flow rate of from 10 to 200 g/10 min as determined in accordance with ISO 1133 (230° C., 2.16 kg) comprising the sequential steps of
   i) polymerizing propylene monomer, and optionally an alpha olefin co-monomer so as to form a polypropylene having an initial melt flow rate of from 0.5 to 20 g/10 min (ISO 1133, 230° C., 2.16 kg),
   ii) visbreaking said polypropylene of step i) to obtain polypropylene having said target melt flow rate and wherein a ratio of target to initial melt flow rate is more than 1, and
   iii) maintaining the polypropylene obtained from step ii) at a temperature of at least 105° C. for a period of at least 48 hours.

2. The method of claim 1 wherein the FOG value as measured in accordance with VDA 278 of the polypropylene obtained after step iii) and having the target melt flow rate is at most 600 µg/g.

3. The method of claim 1, wherein the target melt flow rate is from 20-70 g/10 min and/or wherein the initial melt flow rate is from 2-15 g/10 min.

4. The method of claim 1, wherein the ratio of target to initial melt flow rate is at least 2.

5. The method of claim 1, wherein the polypropylene is a heterophasic propylene copolymer.

6. The method of claim 1, wherein the visbreaking is carried out using a peroxide.

7. A method for the manufacture of a reinforced polypropylene comprising the manufacture of polypropylene according to claim 1, wherein a reinforcing filler is combined with the polypropylene obtained after step ii) and/or step iii).

8. The method of claim 7 wherein the polypropylene obtained after step ii) and/or step iii) and the reinforcing filler(s) are compounded in an extruder so as to form a polypropylene compound.

9. The method of claim 7 wherein the reinforced polypropylene is a fibre reinforced polypropylene and wherein the method further comprises applying a thermoplastic material comprising or consisting of the polypropylene obtained after step ii) or iii) as a sheath over said multifibre strand.

10. The method of claim 7 wherein the reinforced polypropylene is a fibre reinforced polypropylene and wherein the method further comprises pulling a continuous multifibre strand through a thermoplastic material comprising or consisting of the polypropylene obtained after step ii) or iii) in a molten state.

11. The method according to claim 9, further comprising cutting the obtained pulltruded or sheathed continuous multifilament strand in pellets having a length of from 2-50 mm.

12. A thermoplastic composition obtainable by the method according to claim 7.

13. Automotive interior article comprising the polypropylene obtainable by the method according to claim 1.

14. The automotive interior article of claim 13 having an FOG value as measured in accordance with VDA 278 of at most at most 400 μg/g.

15. The automotive interior article of claim 13 having an FOG value as measured in accordance with VDA 278 of at most 250 μg/g.

16. The method of claim 2, wherein FOG value is at most 400 μg/g.

17. The method of claim 16, wherein the FOG value is at most 250 μg/g.

18. The method of claim 4, wherein the ratio of target to initial melt flow rate is from 2 to 20.

19. The method of claim 18, wherein the ratio of target to initial melt flow rate is from 4 to 10.

20. The method of claim 1, wherein step ii) is carried out directly after step i).

* * * * *